(12) United States Patent
Banach et al.

(10) Patent No.: US 7,772,345 B2
(45) Date of Patent: Aug. 10, 2010

(54) MODIFIED NOVOLAK RESIN FOR USE AS TACKIFIER

(75) Inventors: Timothy Edward Banach, Scotia, NY (US); Leigh Scott Howard, Ballston Spa, NY (US); Dominic Maxwell Pearsall, Walsall (GB); Milan Knezevic, Rio Claro (BR); Mark Edward Siudy, Amsterdam, NY (US)

(73) Assignee: SI Group, Inc., Schenectady, NY (US)

( * ) Notice: Subject to any disclaimer, the term of this patent is extended or adjusted under 35 U.S.C. 154(b) by 233 days.

(21) Appl. No.: 11/355,178

(22) Filed: Feb. 16, 2006

(65) Prior Publication Data

US 2006/0199924 A1    Sep. 7, 2006

Related U.S. Application Data

(60) Provisional application No. 60/655,914, filed on Feb. 25, 2005.

(51) Int. Cl.
*C08F 112/06* (2006.01)

(52) U.S. Cl. .................................... 526/347.1
(58) Field of Classification Search ............... 525/502; 526/347.1
See application file for complete search history.

(56) References Cited

U.S. PATENT DOCUMENTS

| 4,073,776 A | 2/1978 | Galkiewicz et al. |
| 4,083,891 A | 4/1978 | Bowers et al. |
| 4,094,834 A | 6/1978 | Bowers et al. |
| 4,167,540 A | 9/1979 | Giller et al. |
| 4,260,704 A | 4/1981 | Schmidt et al. |
| 4,605,696 A | 8/1986 | Benko et al. |
| 4,632,966 A | 12/1986 | Kanagawa et al. |
| 4,889,891 A | 12/1989 | Durairaj et al. |
| 4,892,908 A | 1/1990 | Durairaj et al. |
| 5,021,522 A | 6/1991 | Durairaj et al. |
| 6,642,345 B2 | 11/2003 | Yuasa et al. |
| 6,828,383 B2 * | 12/2004 | Durairaj et al. ............. 525/134 |
| 2004/0116592 A1 * | 6/2004 | Durairaj et al. .......... 524/575.5 |

FOREIGN PATENT DOCUMENTS

| EP | 0362 727 | 9/1989 |
| GB | 1 349 615 | 4/1974 |
| GB | 1 448 374 A | 9/1976 |
| GB | 1 484 278 | 9/1977 |
| JP | 14280/1977 | 2/1977 |

\* cited by examiner

*Primary Examiner*—Mark Eashoo
*Assistant Examiner*—Megan McCulley
(74) *Attorney, Agent, or Firm*—Nixon Peabody LLP; Jeffrey N. Townes

(57) ABSTRACT

The invention is related to a hydrocarbylphenol-formaldehyde linear novolak resin modified with a vinyl monomer. A modified, hydrocarbylphenol-formaldehyde linear novolak resin of the invention is prepared by reacting a hydrocarbyl phenol-formaldehyde linear novolak resin with a vinyl monomer in the presence of an acid catalyst. The invention also relates to a rubber compositions with improved tack comprising a rubber or mixture of rubbers, and the modified, hydrocarbylphenol-formaldehyde linear novolak resin.

17 Claims, No Drawings

MODIFIED NOVOLAK RESIN FOR USE AS TACKIFIER

CROSS-REFERENCE TO RELATED APPLICATIONS

This application claims priority under 35 U.S.C. §119 to U.S. Provisional Application Ser. No. 60/655,914, Feb. 25, 2005; the entire disclosure of which is incorporated by reference.

FIELD OF THE INVENTION

This invention relates to modified, hydrocarbylphenol-formaldehyde linear novolak resins. More particularly, the invention relates to such a resin modified with a vinyl monomer and its improved tack for use in rubber compositions.

BACKGROUND OF THE INVENTION

Rubber products today are made from natural rubber and synthetic rubber or blends thereof. Natural rubber (NR) differs from synthetic rubber (SR). Natural rubber is made from the milk of the rubber tree. This rubber milk, called latex, is a colloidal dispersion in an aqueous medium. Only small percentage of the latex is used directly and the greatest part is processed into hard rubber. Among many different types of synthetic rubbers, the most common synthetic rubbers are SBR (styrene butadiene rubber), BR (butadiene rubber), EPDM (ethylene propylene diene rubber), IR (isoprene rubber), IIR (isoprene isobutylene rubber), NBR (acrylonitrile butadiene rubber), SIS (styrene isoprene styrene), SBS (styrene butadiene styrene) and CR (poly-2-chlorobutadiene). Depending on the production procedure, one differentiates between polymerisates, polycondensates and polyaddition synthetic rubbers.

Rubber (raw rubber) is a non-crosslinked, but cross-linkable (curable, vulcanisable) polymer with rubber-elastic properties at room temperature. Elastomers are polymeric materials that are crosslinked (vulcanized). They are hard and glassy at low temperature and do not exhibit viscous flow even at high temperature. Vulcanization is a process in which rubber, thorough a change in its chemical structure, is converted to a condition in which the elastic properties are conferred or re-established or improved over a greater range of temperature. Examples of rubber products are unwoven textiles from bonded fabrics impregnated with a latex mixture, form products including rubber-metal-compounds such as shock absorbers, elastomers prings, coupling parts, hangers, glues, repair material, foam, micro cellular and cellular rubber products, conveyor belts, flat and vee-belts, tires, sole material, sheet material, and punching products.

Rubber products are frequently made up of several rubber layers each with the same or a different chemical composition. During product manufacture these layers must adhere to one another adequately in the pre-vulcanized state. For example, an assembled tire blank is required to hold together for a fairly long period prior to vulcanization. It is therefore important that the rubber mixtures used have an adequate "tack." The property termed "tack" is defined as the force required to pull apart two pre-vulcanized rubber mixtures which have been pressed together under certain defined conditions. While natural rubber mixtures generally have good tackiness, mixtures of synthetic rubbers are much less tacky and, in extreme cases, possess no tackiness at all. Therefore, it has been common practice to add a tackifier to less tacky rubbers or rubber mixtures to increase their tack. In synthetic rubber products, synthetic rubber adhesive compositions are employed to improve tack and provide good cured adhesion. Various compositions have been proposed.

Rubber compositions containing a tackifier are generally formulated in internal mixers or on sets of rollers from a natural or synthetic rubber (e.g. styrene-butadiene copolymers, polybutadiene) or mixtures thereof, fillers, processing agents and vulcanizing agents. After formulation, the rubber composition is then used in manufacturing to produce the desired rubber product. This includes additives such as reinforcing resins for rubber and elastomers, as tackifiers for rubber, as bonders for friction linings, as curable molding compositions, impregnating agents, coatings, paints, and as binders for fine-particle inorganic substrates. The rubber composition must remain sufficiently tacky during the manufacturing process, even when the process is interrupted for fairly long periods, which is not unusual particularly when manufacturing involves processes at different locations requiring the storage and transport of pre-finished goods.

Known tackifiers include, for example, colophony, hydrogenated and dimerised colophony, terpene resins and modified terpene resins, hydrocarbyl resins based on unsaturated $C_5$ hydrocarbyls, unsaturated $C_9$ hydrocarbyls, dicyclopentadiene or coumarone, phenolic resins of the novolak type, for example those obtained from hydrocarbylphenols having from 4 to 15 carbon atoms in the hydrocarbyl groups by reaction with formaldehyde in an acid medium, and hydrocarbylphenol resins prepared by reacting hydrocarbylphenols with alkynes, particularly acetylene.

Novolak resins are well known tackifiers used in a large variety of rubber compositions. Novolak resins have a repeating structure of phenolic units obtained by reacting phenolic compounds with aldehydes in the presence of an acid catalyst. Differing in chemical structure a variety of phenolic novolak resins have been combined with rubber formulations as tackifier resins. Examples of the variety of novolak resins used as tackifiers include a phenol-crotonaldehyde novolak, the phenolic component of which may be, for example, an alkylphenol and/or a diphenol, e.g. resorcinol or hydroquinone (U.S. Pat. No. 4,167,540); a modified novolak resin comprising terpenes and unsaturated carboxylic acids, and/or derivatives of these compounds (EP-A 0362 727); a phenolic resin referred as a xylok resin comprising a phenol compound and an aralkyl such as p-xylylene glycol dimethyl ether (Japanese Patent Publication No. 14280/1977); or a modified phenol-aralkyl resin obtained by reacting phenols, an aralkyl compound and formaldehyde in the presence of an acidic catalyst (U.S. Pat. No. 6,642,345).

As a further example of the variety of novolak resins, U.S. Pat. No. 4,889,891 discloses an alkyl substituted highly branched resorcinol formaldehyde novolak. U.S. Pat. No. 4,605,696 discloses similar highly branched novolak resins composed of resorcinol monoesters, particularly resorcinol monobenzoate. In U.S. Pat. No. 4,892,908 there is disclosed the use of keto derivatives of resorcinol such as benzoylresorcinol. U.S. Pat. No. 5,021,522 discloses aralkyl substituted phenolic resins, particularly aralkyl substituted resorcinol novolak resins with one or more compounds selected from the group consisting of styrene, alpha-methylstyrene, p-methylstyrene, alpha-chlorostyrene, divinylbenzene and vinylnaphthalenes.

The continuing need for a better tackifier with increased tack has long been recognized in the rubber industry. A particular need exists in the tire industry because of the poor tack by synthetic rubber compositions, such as commercial SBR-based tire compositions, particularly after aging for a substantial period of time. Attempts have been made to improve tack and processing of making tackifiers for a quite some time.

This invention answers that need. This invention relates to a modified hydrocarbylphenol-formaldehyde linear novolak resin having increased tack. The invention also provides a process for preparing the modified resin, and an improved rubber composition containing the modified resin.

SUMMARY OF THE INVENTION

The invention relates to a modified, hydrocarbylphenol-formaldehyde linear novolak resin prepared by reacting hydrocarbylphenol-formaldehyde linear novolak resin with about 1 to about 25 weight percent of a vinyl monomer in the presence of an acid catalyst.

The invention also provides a process for preparing a modified, hydrocarbylphenol-formaldehyde linear novolak resin. In the process, a hydrocarbylphenol-formaldehyde linear novolak resin is reacted with about 1 to about 25 weight percent of a vinyl monomer in the presence of an acid catalyst. The process may also include the step of neutralizing the acid catalyst with a base after the completion of the reaction.

In another aspect, the invention relates to a rubber composition having improved tack comprising a rubber or mixtures of rubbers, and 0.5 to 7 phr of a modified, hydrocarbylphenol-formaldehyde linear novolak resin of the invention.

DETAILED DESCRIPTION OF THE INVENTION

The invention is directed to a hydrocarbylphenol-formaldehyde linear novolak resin modified with a vinyl monomer. A modified, hydrocarbylphenol-formaldehyde linear novolak resin of the invention is prepared by reacting a hydrocarbylphenol-formaldehyde linear novolak resin with a vinyl monomer in the presence of an acid catalyst.

It is known in the art that the phenyl ring of phenols may be derivatized with aldehydes and ketones only by reactions at the ortho- and para-positions to the hydroxyl group. The meta-position on the phenyl ring is not reactive. In the preparation of novolak resins, polymerization occurs at the three ortho- and para-positions. The hydrocarbylphenol-formaldehyde resins used in the invention are prepared from phenols having one hydrocarbyl substituent in one ortho- or in the para-position to the hydroxyl group. This leaves only two ring positions, either two ortho-positions (para-hydrocarbyl substitution) or one ortho-position and one para-position (ortho-hydrocarbyl substitution), available for polymerization. The resulting novolak resin then is a "linear" polymer. Linear novolak polymers to be used in the invention may be prepared from ortho-hydrocarbyl phenols, para-hydrocarbylphenols, or a mixture of ortho-hydrocarbylphenols and para-hydrocarbylphenols. Vinyl modification of a linear novolak resin according to the invention improves the tack of the resin.

Any hydrocarbylphenol-formaldehyde linear resin may be used to form the modified resins of the invention. The polymerization of hydrocarbylphenols with formaldehyde to prepare hydrocarbylphenol-formaldehyde linear resins is well known in the art. The highly exothermic condensation reaction, so called "novolak condensation", is carried out by a method that hydrocarbylphenols react with aldehydes or ketones, especially formaldehyde, in the presence of catalysts, as a rule in the presence of acids, to form hydrocarbylphenol-formaldehyde linear novolak resins (U.S. Pat. No. 4,167,540; U.S. Pat. No. 6,642,345). Preferably, the hydrocarbylphenol-formaldehyde linear novolak resins are a line of novolak resins manufactured by Schenectady International Inc., such as SP-1068, HRJ-2765, HRJ-4047, HRJ-10420, CR-418, HRJ-2355, SMD 31144, and HRJ-11937.

The term "hydrocarbyl" means a hydrocarbon substituent including aliphatic (straight-chain and branched-chain), and cyclic such as alicyclic, aromatic, and cyclic terpenes. Preferably, the hydrocarbyl group of the hydrocarbylphenol-formaldehyde linear novolak resin is a $C_1$-$C_{60}$ hydrocarbyl group. Most preferably, the hydrocarbyl group is a t-butyl or t-octyl group. The hydrocarbyl group may be substituted with common functional groups such as hydroxyl groups, amino groups, carboxylic groups, halogens, thiol groups, disulfide groups, etc. The functional groups should not impair the tackifying properties of the modified, hydrocarbylphenol-formaldehyde linear novolak resin of the invention or of a rubber composition to which the resin is added. Preferably, any functional group is chosen to add beneficial properties to the resin for manufacturing purposes, for increased tack, or for improving the properties of the rubber composition to which it is added.

According to the invention, a modified, hydrocarbylphenol-formaldehyde linear novolak resin is prepared by reacting with about 1 to about 25 weight percent of a vinyl monomer in the presence of an acid catalyst. The modified, hydrocarbylphenol-formaldehyde linear novolak resin preferably has a softening point between 90° and 150° C., and more preferably between 105° and 135° C. The glass transition temperature is typically around 70° C. and residual monomers are generally less than 1%. The following scheme illustrates a modification reaction with a hydrocarbylphenol-formaldehyde linear novolak resin and a styrene derivative.

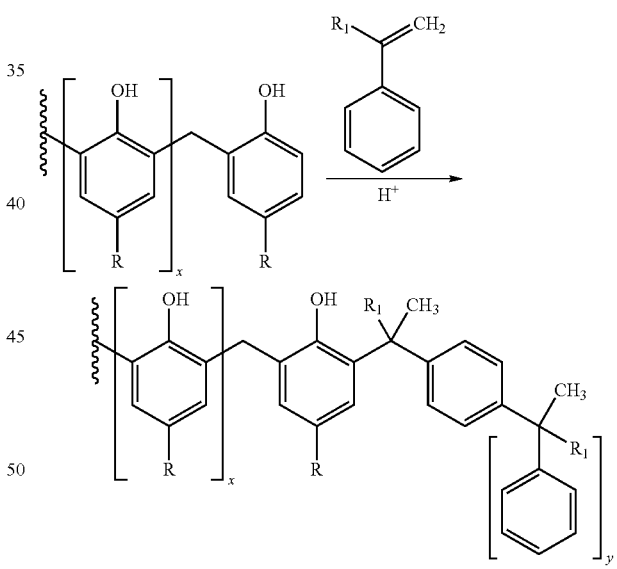

R = t-butyl, or t-octyl;
$R_1$ = H, $CH_3$;
X = number of repeating units;
Y = number of modification with a styrene derivative.

Examples of suitable catalysts for the modification of a hydrocarbylphenol-formaldehyde linear resin are Friedel Crafts catalysts or acid catalysts. The acid catalysts include the inorganic acids such as hydrochloric, sulfuric, phosphoric and phosphorous. The acid catalysts also include the alkyl and arylsulfonic acids such as benzenesulfonic acid, benzenedisulfonic acid, and methanesulfonic acid. The preferred catalysts are the arylsulfonic acid catalysts. Most preferably, the acidic catalysts are toluenesulfonic acid, xylenesulfonic acid, or dodecylbenzene sulfonic acid. The amount of catalyst is preferably in the range of 0.01 to 10 parts of catalyst per 100 parts of phenolic compound.

Any vinyl monomers can be used to modify a hydrocarbyl phenol-formaldehyde linear novolak resin according to the invention. The term "vinyl monomer" means a compound having the vinyl grouping ($CH_2$=CR—). Examples of useful vinyl monomers include, but not limited to: ring-containing unsaturated monomers such as styrene and o-,m-,p-substitution products thereof such as N,N-dimethylaminostyrene, aminostyrene, hydroxystyrene, t-butylstyrene, vinyltoluene, carboxystyrene and the like, alpha-methylstyrene, phenyl (meth)acrylates, nitro-containing hydrocarbyl (meth)acrylates such as N,N-dimethylaminoethyl methacrylate, N-t-butylaminoethyl methacrylate; 2-(dimethylamino)ethyl methacrylate, methylchloride quaternized salt, and the like; olefins or diene compounds such as ethylene, propylene, butylene, isobutene, isoprene, chloropropene, fluorine containing olefins, vinyl chloride, and the like; carboxyl group-containing unsaturated monomers such as acrylic acid, methacrylic acid, crotonic acid, itaconic acid, maleic acid, fumaric acid, and the like (preferably methacrylic acid), $C_2$-$C_8$ hydroxyl hydrocarbyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like, monoesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzoic acid or a fatty acid); monoesters or diesters between an acid anhydride group-containing unsaturated compound (e.g., maleic anhydride or iraconic anhydride) and a glycol (e.g. ethylene glycol, 1,6-hexanediol or neopentyl glycol); chlorine-, bromine-, fluorine-, and hydroxyl group containing monomers such as 3-chloro-2-hydroxylpropyl (meth)acrylate (preferably methacrylate) and the like; $C_1$-$C_{24}$ hydrocarbyl esters or cyclohydrocarbyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octyl methacrylate, decyl methacrylate, lauryl methacrylate, stearyl methacrylate, cyclohexyl methacrylate and the like, $C_2$-$C_{18}$ alkoxyhydrocarbyl esters of (meth)acrylic acid (preferably methacrylic acid), such as methoxybutyl methacrylate, methoxyethyl methacrylate, ethoxyethyl methacrylate, ethoxybutyl methacrylate and the like; polymerizable amides such as (meth)acrylamide, N-methyl(meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth) acrylonitrile, and the like; glycidyl group-containing vinyl monomers such as glycidyl (meth)acrylates and the like, vinyl ethers, vinyl acetate, and cyclic monomers such as methyl 1,1-bicyclobutanecarboxylate. These monomers can be used singly or as admixture of two or more than two. Preferably, the vinyl monomer is selected from the group consisting of a styrenic monomer, an olefin, a (meth)acrylic monomer, a (meth)acrylate monomer, vinyl pyridine, and mixtures thereof. Most preferably, the vinyl monomer is a styrenic monomer selected from the group consisting of styrene, alpha-methylstyrene, chlorostyrene, N,N-dimethylaminostyrene, aminostyrene, hydroxystyrene, t-butylstyrene, carboxystyrene, divinylbenzene, vinylnaphthalene, and mixtures thereof.

The invention also provides a process for preparing a modified, hydrocarbylphenol-formaldehyde linear novolak resin having improved tack comprising the steps of: reacting a hydrocarbylphenol-formaldehyde linear novolak resin with about 1 to about 25 weight percent of a vinyl monomer in the presence of an acid catalyst. The process may preferably include the step of neutralizing the acid catalyst with a base after the completion of the modification reaction. Although any base can be used from caustic NaOH to amines, preferably the base is TEA (triethylamine) or TEAOH (triethanolamine). To modify an existing novolak resin, a modification reaction according to the invention may be carried in a melt of the resin or in a solvent by dissolving the resin in a suitable solvent. As it is known in the art, suitable solvents would include, but not limited to, aromatic solvents such as tolulene or xylene.

As mentioned above, any hydrocarbylphenol-formaldehyde linear resin may be used to form the modified resins of the invention. The modification reaction may be carried out as a subsequent process directly after the phenol-formaldehyde polymerization to form the novolak resin or may be used to modify a novolak resin after initial manufacture. The process is carried out in a reactor, for example a customary vessel or glass flask which is equipped with a stirrer, heater, thermostat, feeding device, reflux condenser and water separator. The hydrocarbylphenols may be initially introduced with the catalyst and brought to the desired reaction temperature or distillation temperature, and the aldehydes or ketones, preferably for example aqueous formaldehyde solution, is added over a period of a few hours. It is also possible to initially introduce only a part of the hydrocarbylphenols and to add the rest along with the formaldehyde at 90-150° C. After condensation is completed, the vinyl monomers are added to the reactor and held for additional time at the reaction temperature, around 150° C. The reaction can be neutralized by base and the water is distilled off.

Modified, hydrocarbylphenol-formaldehyde linear novolak resins prepared according to the invention are useful in a wide variety of applications. The modified resins find utility as, for example, adhesives, dispersants, surfactants, emulsifiers, elastomers, coating, painting, thermoplastic elastomers, engineering resins, ink components, lubricants, polymer blend components, paper additives, biomaterials, water treatment additives, cosmetics components, antistatic agents, food and beverage packaging materials, release compounding agents in pharmaceuticals applications.

A preferred use of the modified resins of the invention is as tackifiers for rubber compositions. In this embodiment of the invention a modified, hydrocarbylphenol-formaldehyde linear novolak resin is added to a rubber composition to improved the tack of the rubber. The rubber composition may be any natural rubber, synthetic rubber or combination thereof. Examples of synthetic rubber include but are not limited to styrene butadiene copolymer polyisoprene, polybutadiene, acrylonitrile butadiene styrene, EPDM, polychloroprene, isobutylene, styrene-isoprene-styrene, styrene-butadiene-styrene and ethylene propylene. The rubber composition itself may be a single rubber or a mixture of rubbers.

Modified, hydrocarbylphenol-formaldehyde linear novolak resins according to the invention may be added to a rubber composition in the same amount, in the same manner and for the same uses as other known tackifiers or novolak resins. Preferably, the modified resin is used in amount ranging from 0.5 to 7 phr, and more preferably from 1 to 4 phr. A single modified resin according to the invention or a mixtures of the resins may be incorporated in the rubber composition.

Modified, hydrocarbylphenol-formaldehyde linear novolak resins according to the invention can also be used as reinforcing resins for rubber and elastomers. For this purpose, they can be incorporated in the still unvulcanized rubber or elastomer mixture either together or separate from crosslinking agents. Rubbers can be used in any desired supplied form, for example as bales or powders and also, for example, with carbon black. Furthermore, polar rubbers are also suitable such as for example nitrile rubber (copolymers of acrylonitrile with butadiene or isoprene) or polyurethane rubber. Other customary additives may also be used in a rubber composition of the invention. These additives include, but are not limited to, fillers, vulcanizing agents, accelerators, activators and processing auxiliaries. The vulcanizates obtained when using the modified novolak resin prepared according to the invention can, for example, be used as industrial rubber goods, such as damping elements, rubber sleeves, bellows, conveyor belts and also for vehicle tires.

The modified novolak resin can also be used as tackifiers for rubber, in particular for synthetic rubber. When rubber articles composed of several layers are prepared, as is particularly necessary in the production of car tires, the customary unvulcanized components often do not have or maintain the tack necessary for assembly. This is particularly the case if the rubber composition is partially, predominantly, or exclusively composed of synthetic rubber. Addition of the modified novolak resin can bring about an adequate increase in the tack.

The modified novolak resin obtainable according to the invention can furthermore also be used in the field of friction linings, of impregnating agents for organic and/or inorganic fibers, of binders for organic and/or inorganic fibers, of coatings, finishes and paints and also of binders for comminuted, preferably inorganic, materials. In these applications, the modified novolak resin can be processed with or without crosslinking agents and also with fillers, additives, pigments and other added substances and then subjected optionally to one or more subsequent heat treatment processes, optionally with shaping, it also being possible for the temperature to be above the decomposition temperature of the novolak.

The process of the invention is further illustrated with reference to the following examples.

Example 1

A Preparation of a Hydrocarbylphenol-Formaldehyde Linear Novolak Resin with a Vinyl Monomer A hydrocarbylphenol-formaldehyde linear novolak resin was prepared with 100 pounds t-octylphenol with formaldehyde. After the novolak condensation was completed in the reactor, add 10 pounds of alpha-methylstyrene to the reactor and the mixture was heated to 150° C. Once this temperature had been reached, hold the reaction temperature at least three hours. After the reaction was completed, triethanolamine was then added to the mixture. The solvent was removed by distillation on the downward-inclined condenser, initially at atmospheric pressure, until a bottom temperature of 170° C. had been reached. During this procedure, the reactor was flushed with nitrogen as inert gas. Once 170° C. had been reached, steam distillation was carried out at reduced pressure for 30 min to remove the unreacted monomer or solvent. Distillation was then continued for a further 30 min at 170° C. under reduced pressure (27 hPa=27 mbar). The free hydrocarbylphenol content of the resin was less than 1%.

Example 2

Rubber Formulation with a Modified, Hydrocarbylphenol-Formaldehyde Linear Novolak Resin Tackifier Preparation of the Rubber Composition Rubber or a corresponding amount of a carbon black-rubber mixture are first applied to a set of rollers. When a sealed sheet has formed, further ingredients selected from stearic acid, zinc oxide, processing adjuvants, anti-oxidants, vulcanizing agents, e.g. a phenol resin or sulphur, filler and processing oil, and the modified hydrocarbylphenol novolak resin which improves the tackiness are mixed in one after the other. The mixtures are then rolled for five minutes at temperatures of from 100° to 120° C. (measured on the surface of the mixtures running on the rollers). The temperature must be significantly higher than the melting point of the resin used and may accordingly be increased even to above 120° C. Mixing is subsequently completed by adding an accelerator at conventional mixing temperatures, i.e. at temperatures at which the accelerator does not react, e.g. at temperatures of up to 120° C.

Rubber compositions using the modified hydrocarbylphenol-formaldehyde linear novolak resin tackifier are shown in Table 1.

TABLE I

| Composition | |
|---|---|
| Natural rubber | 70 |
| Butadiene rubber | 30 |
| Carbon Black | 70 |
| Zinc Oxide | 3 |
| Stearic Acid | 1 |
| Antioxidant | 0.25 |
| Aromatic Oil | 16.5 |
| Ozone protective wax | 0.5 |
| 6-p-Phenyleneduamine | 1 |
| Sulfur | 2 |
| N-tert-2-benzothiazolesulfenamide | 3 |
| N-cyclohexylthiophthalimide | 0.2 |
| Resin | 4 |

Rubber compositions containing modified hydrocarbylphenol-formaldehyde linear novolak resins according to the invention were evaluated according to the following tests:

Mixing-Banbury Mixing: ASTM D3182-89 (2001)

Scorch-Mooney Scorch: ASTM D1646-03

Oscillating Disk Rheometer: ASTM D2084-01

Rebound Resilience: DIN 53512

The test results for the rubber compositions containing modified hydrocarbylphenol-formaldehyde linear novolak resin are given in Table 2. Corresponding values for resin-free composition (Blank) and for compositions containing t-octylphenol (PTOP) and t-butylphenol (PTBP) novolak resins with alpha-methylstyrene (AMS) or vinylpyridine as a vinyl modifier are compared for tack, Mooney Scorch and ODR. The control composition (blank) which does not have any tackifier for comparison purpose has very low tackiness (0.2). Compare with the blank, the rubber mixtures with modified resin show a considerable increase in tackiness.

Mooney scorch values were determined on a Mooney Viscometer at 121° C., and represent the compounds' resistance to premature vulcanization. The values reported are the times required for a five-point rise from the minimum Mooney viscosity at the test temperature. Larger values represent a resistance to premature vulcanization; shorter times indicate a tendency to "scorch."

Vulcanization characteristics were determined on a Oscillating Disc Rheometer ("ODR"), the tests being performed at 153° C. The parameters Rmin and Rmax are the minimum rheometer torque (before the onset of vulcanization) and the maximum rheometer torque (due to vulcanization), respectively. The parameter t90 is the time required for the occurrence of 90% of the increase in torque due to vulcanization (time at R/(Rmax-Rmin)=0.90).

TABLE 2

|   | Resin base | Vinyl monomer used for modification of the resins | Percent NR % | Percent PbdR % | Tack 1 day | Tack 3 day | Mooney Scorch t5 | ODR t90 |
|---|---|---|---|---|---|---|---|---|
| 1 | PTOP | AMS | 30 | 70 | 81.9 | 66.2 | 20.33 | 12.57 |
| 2 | PTBP | AMS | 30 | 70 | 12.4 | 16.1 | 22.3 | 10.21 |
| 3 | Blank |  | 30 | 70 | 0.2 | 0.3 | 20.25 | 11.98 |
| 4 | PTOP | AMS | 70 | 30 | 18.3 | 13.3 | 15.25 | 10.46 |
| 5 | PTOP | Vinyl Pyridine | 70 | 30 | 9.3 | 3.3 | 14.05 | 10.11 |
| 6 | PTBP | AMS | 70 | 30 | 21.8 | 18.6 | 15.3 | 8.89 |
| 7 | Blank |  | 70 | 30 | 0.7 | 0.8 | 17.09 | 11.13 |
| 8 | PTBP | AMS | 100 | 0 | 32.6 | 15.5 | 7.99 | 10.86 |
| 9 | PTOP | AMS | 100 | 0 | 17.0 | 15.6 | 9.25 | 9.76 |
| 10 | Blank |  | 100 | 0 | 13.6 | 15.2 | 10.17 | 9.7 |
| 11 | PTOP | Styrene | 70 | 30 | 5.1 | 7.9 | 18.43 |  |
| 12 | PTBP | Styrene | 70 | 30 | 10.6 | 11.5 | 17.64 |  |

The claimed invention is:

1. A modified, hydrocarbylphenol-formaldehyde linear novolak resin prepared by reacting hydrocarbylphenol-formaldehyde linear novolak resin with about 1 to about 25 weight percent of a vinyl monomer in the presence of an acid catalyst, wherein the hydrocarbylphenol-formaldehyde resin is prepared from a hydrocarbylphenol having one hydroxyl group and one hydrocarbyl substituent, the hydrocarbyl substituent being in either the ortho position or the para position, relative to the hydroxyl group of the hydrocarbylphenol.

2. The modified, hydrocarbylphenol-formaldehyde linear novolak resin of claim 1, wherein the hydrocarbyl group is selected from the group consisting of a $C_1$-$C_{60}$ hydrocarbyl group.

3. The modified, hydrocarbylphenol-formaldehyde linear novolak resin of claim 2, wherein the hydrocarbyl group is a t-butyl or t-octyl group.

4. The modified, hydrocarbylphenol-formaldehyde linear novolak resin of claim 1, wherein the vinyl monomer is selected from the group consisting of a styrenic monomer, an olefin, a (meth)acrylic monomer, a (meth)acrylate monomer, a vinylpyridine and mixtures thereof.

5. The modified, hydrocarbylphenol-formaldehyde linear novolak resin of claim 4, wherein the vinyl monomer is a styrenic monomer selected from the group consisting of styrene, alpha-methylstyrene, chlorostyrene, N,N-dimethylaminostyrene, aminostyrene, hydroxystyrene, t-butylstyrene, carboxystyrene, divinylbenzene, vinylnaphthalene and mixtures thereof.

6. A rubber composition having improved tack comprising a rubber or mixtures of rubbers, and
0.5 to 7 phr of the modified, hydrocarbylphenol-formaldehyde linear novolak resin of claim 1.

7. The rubber composition of claim 6, wherein the hydrocarbyl group of hydrocarbylphenol-formaldehyde linear novolak resin is a $C_1$-$C_{60}$ hydrocarbyl group.

8. The rubber composition of claim 6, wherein the hydrocarbyl group of hydrocarbylphenol-formaldehyde linear novolak resin is a t-butyl or t-octyl group.

9. The rubber composition of claim 6, wherein the vinyl monomer is selected from the group consisting of a styrenic monomer, an olefin, a (meth)acrylic monomer, a (meth)acrylate monomer, a vinylpyridine and mixtures thereof.

10. The rubber composition of claim 9, wherein the vinyl monomer is a styrenic monomer selected from the group consisting of styrene, alpha-methylstyrene, chlorostyrene, N,N-dimethylaminostyrene, aminostyrene, hydroxystyrene, t-butylstyrene, carboxystyrene, divinylbenzene, vinylnaphthalene and mixtures thereof.

11. A process for preparing a modified, hydrocarbylphenol-formaldehyde linear novolak resin having improved tack, comprising the steps of:
reacting a hydrocarbylphenol with formaldehyde to form a hydrocarbylphenol-formaldehyde linear novolak resin, wherein the hydrocarbylphenol has a hydrocarbyl substituent in either the ortho position or the para position, relative to the hydroxyl group of the hydrocarbylphenol, and
reacting the hydrocarbylphenol-formaldehyde linear novolak resin with about 1 to about 25 weight percent of a vinyl monomer in the presence of an acid catalyst.

12. The process of claim 11 further comprising the step of neutralizing the acid catalyst with a base after the completion of the reaction.

13. The process of claim 11, wherein the hydrocarbyl group of the hydrocarbylphenol-formaldehyde linear novolak resin is a $C_1$-$C_{60}$ hydrocarbyl group.

14. The process of claim 11, wherein the hydrocarbyl group of hydrocarbylphenol-formaldehyde linear novolak resin is a t-butyl or t-octyl group.

15. The process of claim 11, wherein the vinyl monomer is selected from the group consisting of a styrenic monomer, an olefin, a (meth)acrylic monomer, a (meth)acrylate monomer, a vinylpyridine and mixtures thereof.

16. The process of claim 15, wherein the vinyl monomer is a styrenic monomer selected from the group consisting of styrene, alpha-methylstyrene, chlorostyrene, N,N-dimethylaminostyrene, aminostyrene, hydroxystyrene, t-butylstyrene, carboxystyrene, divinylbenzene, vinylnaphthalene and mixtures thereof.

17. The process of claim 11, wherein hydrocarbylphenol has one hydroxyl group and one hydrocarbyl substituent.

* * * * *